United States Patent [19]

Ho et al.

[11] Patent Number: 5,448,754
[45] Date of Patent: Sep. 5, 1995

[54] RADIO FREQUENCY SHARING PERSONAL COMMUNICATIONS SYSTEM

[75] Inventors: C. M. Peter Ho, Charlotte, N.C.; John D. Lockton, Hillsborough, Calif.

[73] Assignee: Corporate Technology Partners

[21] Appl. No.: 177,912

[22] Filed: Jan. 6, 1994

Related U.S. Application Data

[63] Continuation of Ser. No. 59,168, May 7, 1993, abandoned.

[51] Int. Cl.$^6$ .............................................. H04Q 7/20
[52] U.S. Cl. ...................................... 455/34.1; 455/54.2; 455/54.1; 455/63; 455/67.3; 379/59
[58] Field of Search ............... 455/33.1, 34.1, 34.2, 455/54.1, 56.1, 62, 63, 67.1, 67.3, 226.2; 379/59, 60

[56] References Cited

U.S. PATENT DOCUMENTS

| | | | |
|---|---|---|---|
| 5,276,908 | 1/1994 | Koohgoli et al. | 455/34.1 |
| 5,287,544 | 2/1994 | Menich et al. | 455/33.1 |

OTHER PUBLICATIONS

Telocator Spectrum Sharing Report (Jan. 20, 1993) pp. 8-9, 17-21, 31-34.

*Primary Examiner*—Edward F. Urban
*Assistant Examiner*—Lee Nguyen
*Attorney, Agent, or Firm*—Flehr, Hohbach, Test, Albritton & Herbert

[57] ABSTRACT

A radio communications system which is channelized and constituted in cellular array shares the spectrum with other fixed radio communications systems but complies with FCC rules as to interference to these fixed systems. It still maintains however good quality in its signals. Interference is determined by real-time field measurements of interference received from fixed stations on both forward and reverse offset channels by base stations and a mobile terminals. Such real-time measurements besides sensing the quality of a signal can be used to determine interference to the nearby microwave fixed users. In addition compensation is made for multiple users and thus no worst case compromises need be adopted as in prior systems.

6 Claims, 6 Drawing Sheets

RADIO FREQUENCY SHARING PERSONAL COMMUNICATIONS SYSTEM

This is a continuation of application Ser. No. 08/059,168, filed May 7, 1993, and now abandoned.

BACKGROUND OF THE INVENTION

This invention relates to radio communication systems which need to share spectrum with other radio communication systems, especially but not restricted to, personal communications systems (PCS).

DESCRIPTION OF THE PRIOR ART

Cellular radio communications systems are able to service a high volume of traffic with a limited amount of radio spectrum, by re-using the same radio channels in geographically separated cells. Each cell makes use of a subset of channels that are available in the frequency band allocated to the particular systems. The determination of channel usage by a particular cell is made based on traffic demand in the area of the cell, and particularly on prospective interference from neighboring cells. Cellular radio systems are engineered so that harmful levels of interference from neighboring cells is avoided.

Micro-cellular, PCS radio systems are just being introduced which use the same basic frequency re-use approach as has been employed for cellular radio communications systems. With smaller cells (i.e., micro-cells) capacity is increased and equipment cost reduced. This makes PCS competitive both to cellular radio communications systems and to present land line telecommunications (so called "wireless local loop".) Another difference between micro-cellular, PCS radio systems and cellular radio communication systems is that micro-cellular uses frequency agility and dynamic rather than fixed channel allocation. With frequency agility and dynamic channel allocation, each cell can potentially use any traffic channel for a given call from among the channels allocated to the particular cell. The decision as to which channel to use is based on channel usage conditions at the time of call set-up. Also, unlike cellular radio communications systems, the decision is made in a decentralized manner by the base station or subscriber terminal in question, without any centralized coordination with other cells. This means more traffic can be handled because channels used in neighboring cells can be "borrowed". It also provides flexibility in dealing with interference. For example, a traffic channel may have little measurable interference when this is determined from the PCS base station end of a transmission. However, there might be substantial interference on a traffic channel when the determination is made from the subscriber terminal end of a transmission. With decentralized determination of which channels to use, and frequency agility and dynamic channel allocation, a micro-cellular, PCS radio system has the system architecture to adjust flexibly to varying interference conditions.

The U.S. FCC (Federal Communications Commission) and most other countries of the world, have chosen to introduce PCS in the 1.8 to 2.2 Gigahertz frequency band. This is a band that is currently extensively used for fixed microwave transmission. A fixed microwave transmission occupies 5 to 10 Megahertz of frequency and can occupy a path between transmitter and receiver of up to 30 miles. Normally the transmitter at one end of a microwave path is offset 80 MHz from the transmitter at the other end of the microwave path, as are the corresponding microwave receivers.

Many fixed microwave users are major utilities (electric, telephone) and safety services (police, fire, hospital). Accordingly, these user cannot be moved from the 1.8 Gigahertz–2.2 Gigahertz frequency band to make way for PCS. To operate PCS it is, therefore, required that PCS be able to share frequency with fixed microwave transmissions without either interfering with the fixed microwave transmissions or being interfered with by the fixed microwave transmissions.

The approach that has been developed to date to meet this problem uses statistical predictions of interference and actual field measurements of interference to determine which PCS channels can be used in a given cell. The statistical prediction of interference is done through use of one of a number of commercially available propagation prediction models. Location, power and frequency of neighboring fixed microwave transmissions are input to the model, as well as PCS base station location. A grid map is then set up forths cell site served by the base station, and at each grid point on the map of the cell, the statistical prediction model makes an initial determination of which PCS traffic channels are usable. Usable PCS traffic channels are those which do not interfere with the fixed microwave transmissions in the area and which are not interfered with by the fixed microwave transmissions in the area.

Next, the validity of the statistical predictions must be verified by actual field measurements at the grid points of the map for the cell. This is accomplished by using sophisticated propagation measurement equipment and requires a high level of technical skills to correctly analyze results. Many hundreds of field measurements may be required even in a small cell. Further, remeasurement is required if PCS base stations are relocated or microwave paths changed.

The results of the statistical interference predictions and field measurements are normally stored in a centralized data base for the micro-cell, PCS system. This data base determines for each PCS call in a cell which channels are usable. This type of approach to frequency sharing is referred to as the statistical approach.

The statistical approach has several drawbacks:

- Cost is very high because of the need for substantial initial and continuing field measurements.
- Capacity of the micro-cellular, PCS systems is reduced because of the need to assume worst case interference conditions. For the statistical approach it must be assumed that PCS channels are being used by a system maximum number of subscribers, i.e., interference is at its greatest. Also, channels must be excluded from use throughout the cell if unusable in any part of the cell. In fact, a fixed microwave transmission may impact only part of a cell and a traffic channel would, therefore, be quite usable in other parts of a cell. Finally, the statistical approach requires establishment of safety margin "buffer zones" around the fixed microwave paths, again reducing capacity.
- Certainty of protection of fixed microwave users is reduced. The statistical approach depends ultimately on the capability of the technicians doing the field measurements, and if they err, substantial interference to fixed microwave transmissions would occur.

Lessened flexibility and speed in installation and movement of base stations also results from the statistical approach. Every time a base station is installed or moved, a substantial amount of time and effort must be spent to complete the statistical approach and its necessary field measurements.

Finally FCC regulation is made difficult by the statistical approach. For the FCC to properly regulate frequency sharing based on the statistical approach, it needs both to monitor the accuracy of field measurement and statistical predictions and assure itself that PCS system operators are in fact conforming to the parameters thus established. This is an impossible task for the FCC.

There is accordingly a need for a frequency sharing approach which allows PCS to automatically co-exist with fixed microwave without the need for field measurements and without the other disadvantages of the prior statistical approach listed above. By automatically and dynamically adjusting to fixed microwave interference in a given cell, system cost could be lowered, capacity increased, flexibility and speed of installation and movement of base stations improved, protection of fixed microwave users made more certain and FCC regulation of PCS simplified.

OBJECT AND SUMMARY OF INVENTION

It is therefore a general object of the present invention to provide an improved radio frequency sharing approach for PCS. However, the invention also extends to any radio technology which is configured in cellular fashion (i.e., repeat use of same channels and frequency) wherein said radio technology is required to share frequency with another radio service.

In accordance with the above object there is provided a method of determining the availability of wireless communication traffic channels for use between fixed base stations in a predetermined geographical region and relatively mobile subscriber terminals where the base stations and mobile terminals are linked by forward and reverse frequency channels and where the radio spectrum in which the traffic channels operate must co-exist on a frequency sharing basis with existing fixed radio frequency users without interference either to or from the fixed users. The method comprises automatically and dynamically adjusting to interference to or from the fixed users by selecting usable traffic channels by the following steps: measuring interference from fixed users to base stations for reverse channels and determining the quality of such reverse channels compared to a predetermined quality threshold; determining interference from the base stations to the fixed users on forward channels by using the above measured reverse channel interference, and the known powers of the base stations and the fixed users and the operating bandwidth and frequency of the fixed users; comparing such determined interference to a predetermined interference threshold; measuring interference from fixed users to mobile terminals for forward channels and determining whether the quality of such forward channels is acceptable compared to predetermined quality thresholds; determining interference from the mobile terminals to the fixed users on reverse channels by using the above measured forward channel interference; comparing such determined interference in the previous step to a predetermined interference threshold, and assigning the mobile terminals to a traffic channel providing interference below the thresholds. Interference measurement is to be continued at base stations and mobile terminals such that if at any time above threshold interference is caused to fixed users or quality is below a predetermined standard, the subscriber is automatically and dynamically moved to another traffic channel with acceptable interference and quality characteristics using in this connection the agile capabilities of the PCS system.

DETAILED DESCRIPTION OF PREFERRED EMBODIMENT

Figure 1:
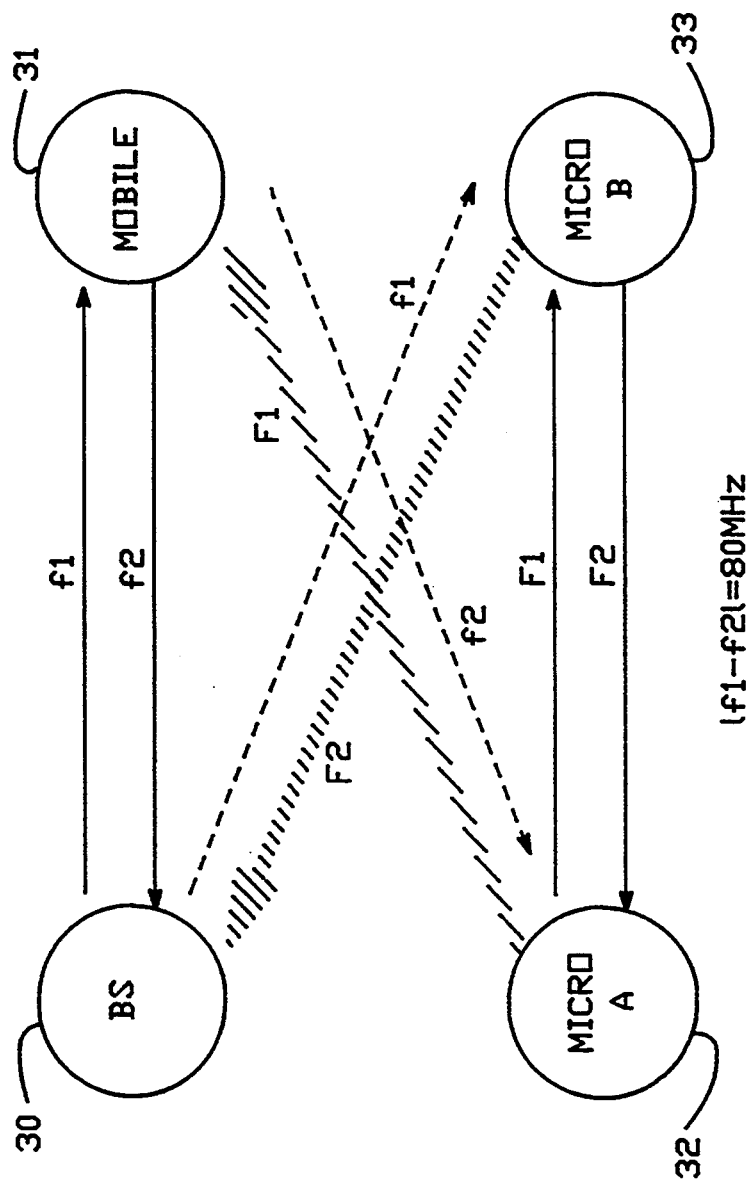
FIG. 1 is a block diagram of a PCS system showing its relationship with a fixed microwave link.

FIG. 1 shows a general interference situation between a PCS (personal communications system) (which includes a base station BS, 30, and a mobile subscriber terminal, mobile 31. As illustrated the base station transmits on a forward frequency channel or link, f1, and receives transmissions on an offset (for example, 80 MH$_z$) frequency channel, f2. In other words the mobile terminal 31 transmits on the frequency f2 and receives on the frequency f1. A fixed radio frequency user link is illustrated by microwave tower A32 and microwave tower B33. These would be fixed radio frequency users in a predetermined geographical region based on whether the fixed radio frequency users are within a distance to BS, 30, or mobile, 31, such that the fixed radio frequency users could interfere with f1 or f2 or be interfered with by f1 or f2.

And there is a possibility of interference to these fixed user stations because Micro A transmits to mobile 31 on the forward link F1 and receives on the reverse link F2 and vice versa for Micro B. The offset frequency of 80 megahertz is standard for microwave links. However any other suitable offsets could be provided or could exist in a given situation. F1, f1 and F2, f2 are the same frequencies with the upper case indicating fixed user stations.

There are four sources of interference between the PCS system 30, 31 and the fixed user system 32, 33; these are indicated by the dashed or broken frequency lines f1, f2, F1 and F2. Specifically these are the following:

Interference from Microwave Station A to the mobile

Interference from Microwave Station B to the base station

Interference from the mobile to Microwave Station A

Interference from the base station to Microwave Station B.

Of the above four sources of interference, the present invention only actively senses the first two. But the latter two, that is interference toward the Microwave Stations A and B, is determined as will be shown below in a very accurate matter through application of algorithms to simple known operating parameters. This eliminates the necessity of making complicated propagation measurements in the field as was discussed in the prior art section.

Figure 2:
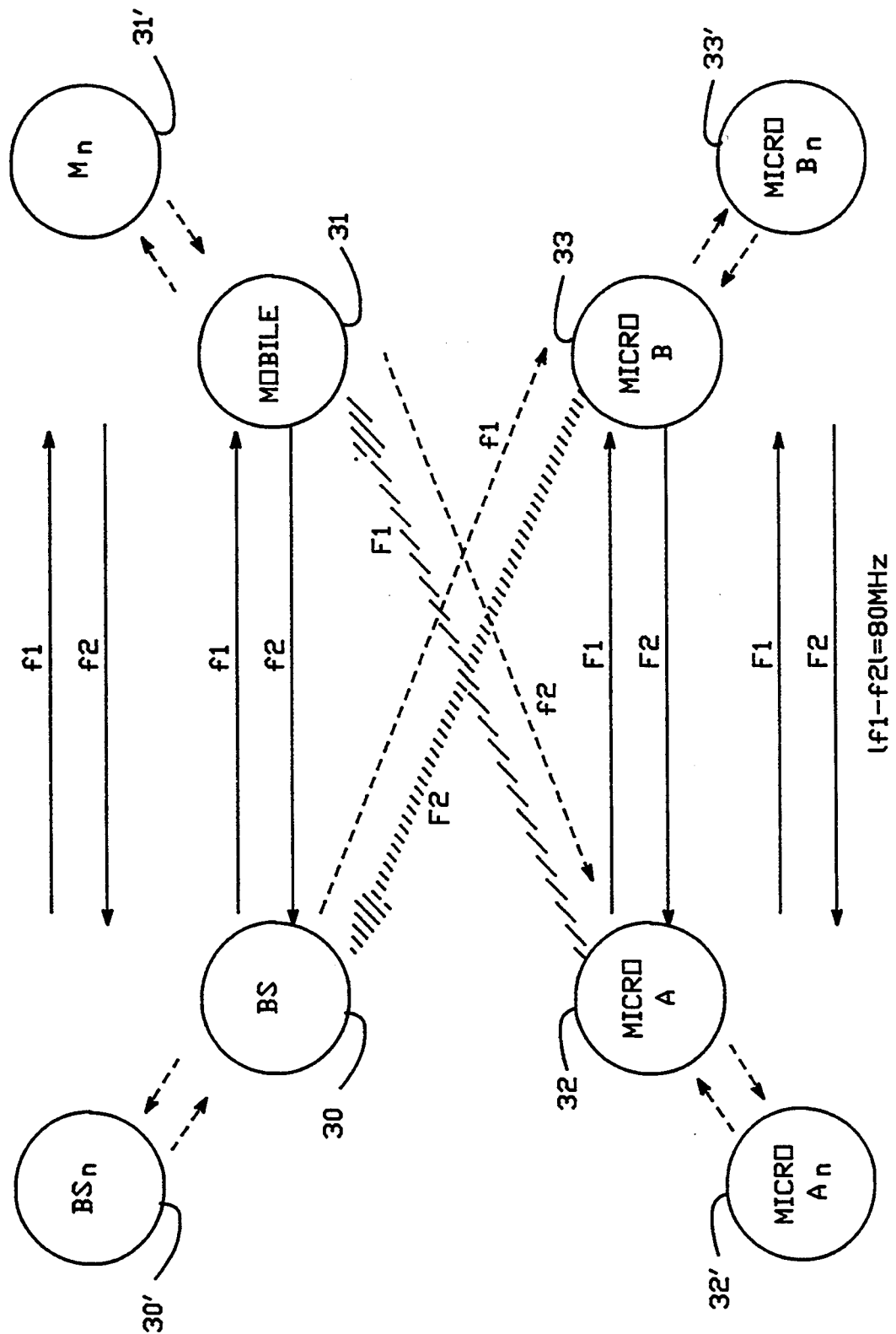
FIG. 2 is a more generalized block diagram of FIG. 1 illustrating multiple microwave links and personal communications systems.

FIG. 1 shows an idealized situation. Since as a practical matter there will be multiple PCS base stations and mobiles, and multiple fixed microwave user systems, these are illustrated in FIG. 2, as the additional PCS systems as 30', 31' and the additional fixed microwave users as 32', 33'. The dashed lines going in and out of these various units illustrate the possible sources of interference. However, referring back to FIG. 1, the general concept of the invention is readily shown with the more simplified case of one base station 30 and mobile terminal 31 and a single microwave link 32, 33.

In order to implement the strategy of the present invention in providing interference measurement sensing to protect fixed users from interference from PCS systems and also maintaining the signal quality of the forward and reverse channels, and at the same time being able to move to a different traffic channel when interference or quality conditions deteriorate below acceptable thresholds (i.e., using frequency agility and dynamic channel allocation), it is necessary that the base station 30 and the mobile terminal 31 in the preferred embodiment have data calculating ability.

Figure 3:
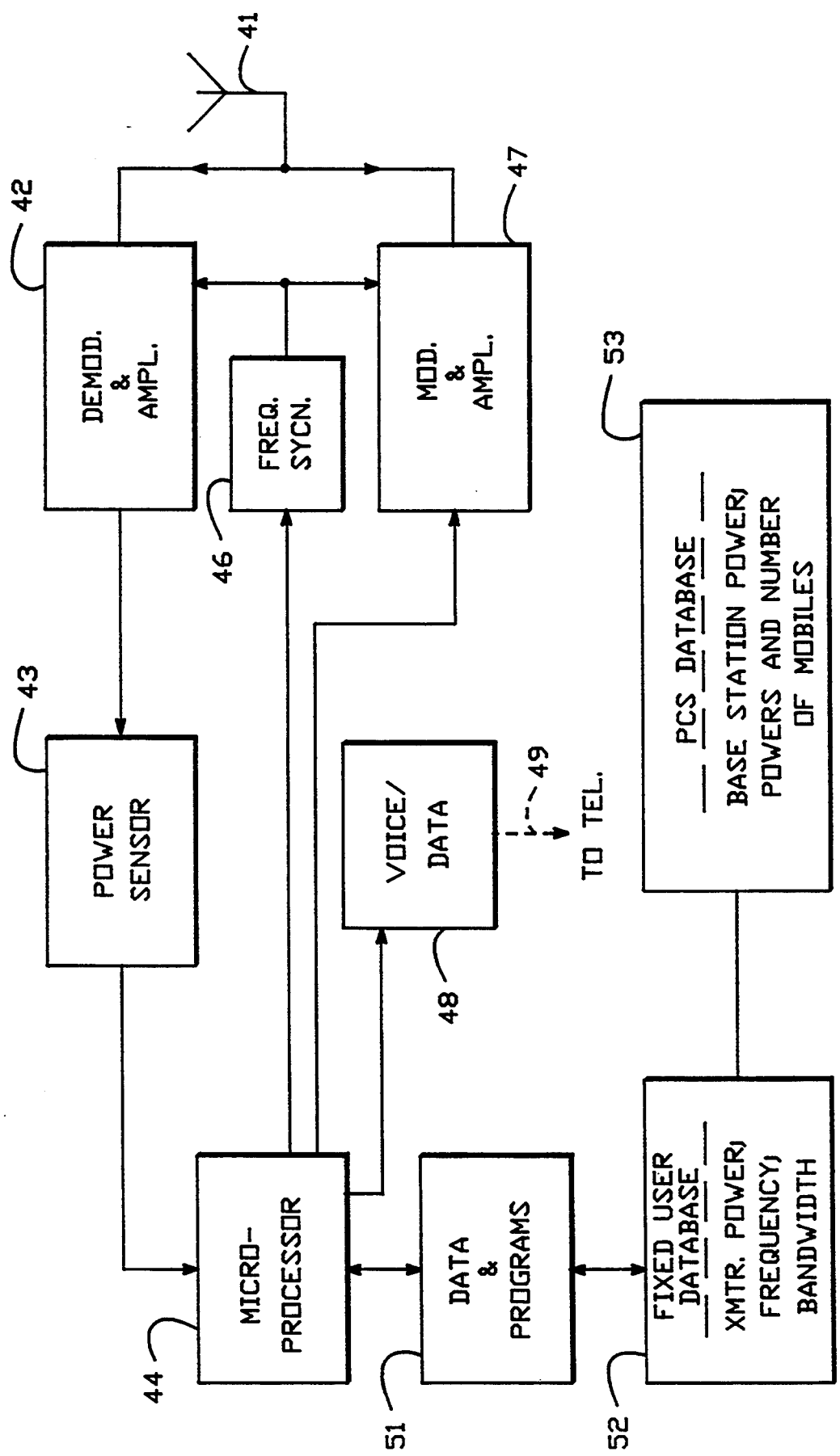
FIG. 3 is a simplified block diagram illustrating either a base station or a mobile terminal of FIGS. 1 and 2.

Thus, FIG. 3 shows a typical base station or a mobile station which of course includes an antenna 41. The incoming signal is demodulated and amplified at 42 and its power sensed at 43 (to provide interference sensing). And then that output is coupled to a microprocessor 44.

From an outgoing point of view, the microprocessor drives a frequency synthesizer 46 which controls both the incoming demodulator and amplifier 42 and outgoing modulator and amplifier 47 connected to antenna 41. Digital information received through microprocessor 44 is either converted to data or voice on unit 48 and perhaps linked to a telephone system as illustrated by the dashed line 49. Also information received is stored as data or programs in storage unit 51.

Depending on whether the unit is a base station 30 or mobile terminal 31, it may have a fixed user data base 52 which includes the information as to surrounding fixed microwave users in the same geographical area and would include parameters such as transmitter power, frequency and operating bandwidth. Block 53 indicates a PCS database which includes data concerning the PCS systems such as the power of the various base stations, the transmitting power of the mobile terminals and the number of mobiles in use. Generally a mobile terminal would not store system parameters as in blocks 52 and 53 but would have necessary data passed to it by a base station.

Referring to FIG. 1 and the simple one base mobile station and a pair of microwave users A and B, it is necessary to determine the interference caused by and into the forward channel f1, and whether that interference is sufficiently low to allow the forward channel to be used (i.e., does it have sufficient quality and can it be used without interfering with the fixed user). To determine the foregoing, the list of equations 1 through 19 at the end of the specification, will be referred to.

First there is measured the interference from microwave station B to the base station 30 which is Equation 1. Pt(B) is the power transmitted by the microwave station B, $PL_{B/BS}$ is the measured path loss from microwave station B to the base stations and the symbols $G_B$ and $G_{BS}$ are the antenna gains of the respective microwave and base terminals. Measurement is in decibels (dB values). Thus Equation 1 reveals how much of the power due to path loss is lost from the transmission before reaching the BS. The path loss derived from Equation 1 is effectively utilized in Equation 2 since it is assumed that the same path loss occurs in both directions (i.e., same from B to BS as from BS to B). $I_{BS/B}$ is actually how much interference BS is causing to B. Also Equation 2 is based on the transmitter and receiver antenna gains being the same at the microwave tower and PCS base station. All that need be known as indicated by Equation 2 is the additional factor of the Pt(BS) which is the power transmitted by the base station.

Once the interference from BS to B from use of forward channel f1 is determined by Equation 2, Equation 3 is applied where the threshold $Th_B$ is an allowable threshold interference set by the FCC under its regulations and the EIA's TSB-10E. If such rules are changed and more or less interference allowed, this would simply mean lowering or raising the threshold. This has a practical effect that there would be less or more usable traffic channels if, for example, a lesser or greater threshold of interference were allowed by the FCC.

Assuming that Equation 3 is satisfied, the frequency f1 can be transmitted without interfering with microwave station B. The mobile 31 then needs to determine whether the interference from microwave station A is small enough (see the microwave transmission F1 as illustrated in FIG. 1) so as not to degrade the quality of the received forward channel f1 at mobile terminal 31. Here, of course, there is a direct measurement of interference F1 from the fixed user 32 to the mobile 31 on the forward channel. And this has been designated $I/A$ mobile. Equation 4 is applied which is actually a figure of merit for determining the quality of transmission of a CDMA signal which is a ratio of the bit energy to noise density. Other factors in the equation include PG, processing gain, R, bit rate, W the spreading bandwidth, and $\eta$ is thermal noise power. $Pr_{mobile}$ is the power of the desired signal received at the mobile which is a function of the transmitter power of the base station, location of the mobile and the propagation. This is effectively set at a convenient figure. It should again be emphasized that this equation is specifically set up for CDMA. The same general approach would be taken to determine quality for other radio modulation approaches such as Time Division Multiple Access ("TDMA").

If the forward channel is not interfering and has sufficient quality, similar determinations are made as to the reverse channel f2. These need not necessarily be done in the order outlined here. Here Equation 16 is utilized, similar to Equation 1, which determines the path loss from microwave station A to the mobile. With the path loss determined Equation 17 is applied to determine interference that the mobile will cause to MICRO A on the reverse channel.

Finally whether this interference is below the appropriate threshold is determined by Equation 5. Again as in Equation 3, $Th_A$ is an FCC determined threshold and the transmitting powers of the mobile and fixed user are necessary.

With regard to quality to determine whether the reverse channel f2 is usable, Equation 18 applies (see Equation 4). Here of course the major factor used (and which was necessary) is the interference from Micro B to the base station 30 designated as $I_{B/BS}$.

Thus it is apparent that the measured interference at both the base station 30 and the mobile terminal 31 serve two functions. First to determine if by use of reciprocity there is too much interference to the existing microwave users on both the forward f1 and reverse f2 channels; secondly, the other use is to determine the quality of the received signal as impacted by the microwave signals F1 and F2.

Thus to summarize the foregoing in more general terms, interference is measured from a fixed user to a base station for a reverse channel and the quality of that reverse channel is directly determined from that interference measurement. At the same time using reciprocity the reverse channel interference measurement is used to determine forward channel interference with the fixed user. Similarly interference is measured on a forward channel from a fixed user to a mobile terminal and the quality of that forward channel determined. Again using reciprocity this forward channel interference measurement is used to determine the interference from a mobile terminal to a fixed user on a reverse channel. After all of the foregoing is done and the proper thresholds met, then the system may assign a usable traffic channel.

In general it should be noted, and still referring to the two interference measurements, one made at base station and one at mobile, these must be continuing real-time measurements. In the case of the mobile terminal, as mobiles move around a particular cell or geographical area, or as more mobiles are added (calls made) or completed (calls released) on a particular reverse channel, both interference to fixed microwave from the reverse channel and quality of the forward channel transmission changes, both of these being measured from the mobile.

In the case of the base stations while no movement of base stations occurs, still calls are being added and released on forward channels and reverse channels, and mobiles are moving. This increases or decreases potential interference to fixed microwave from the forward channel and also the quality of the reverse channel transmission, both of these being measured from the base station. Thus new measurements and computations must be measured on a real-time basis as each call is added or dropped.

Figure 4:
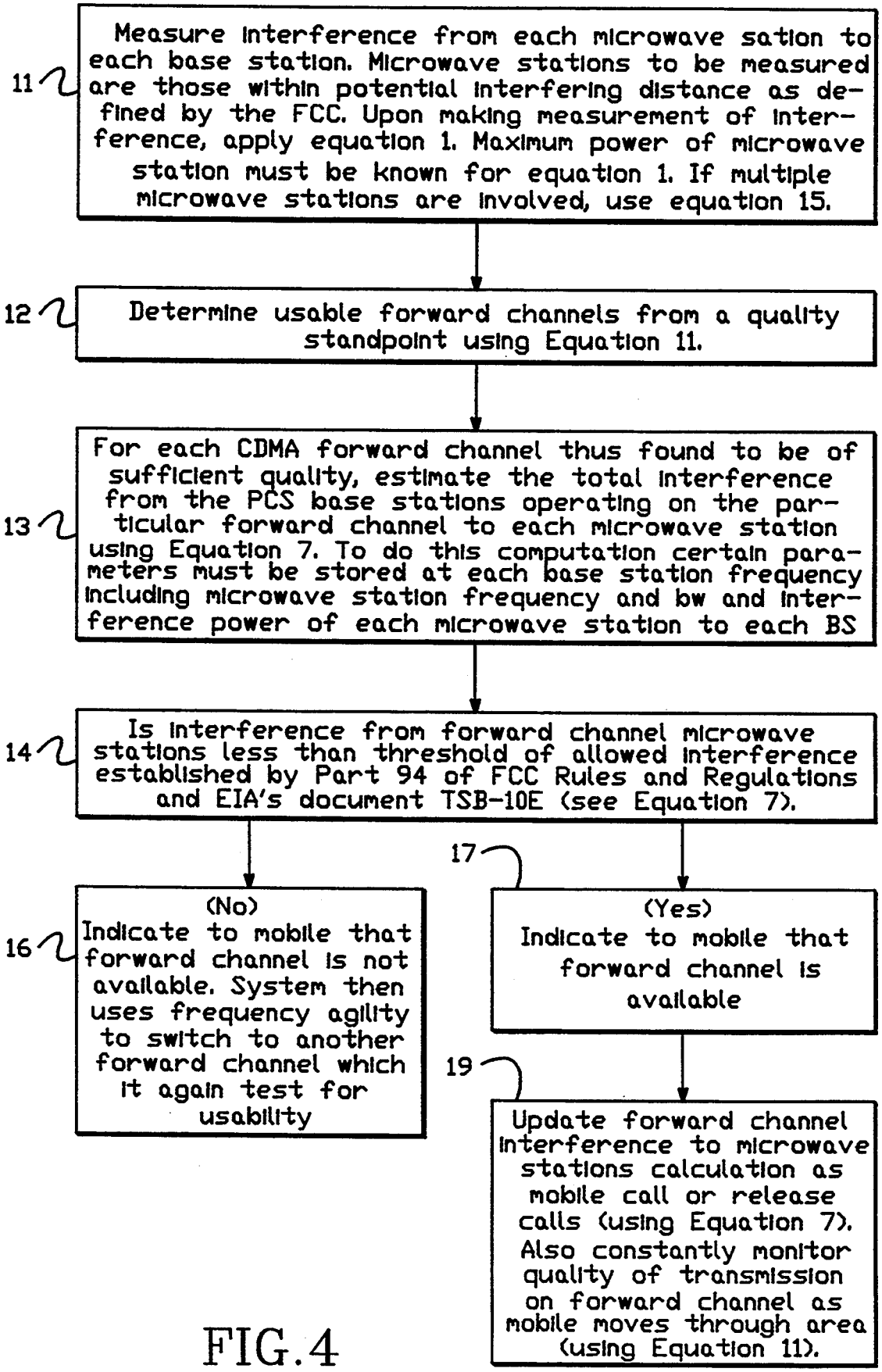
FIG. 4 is a flow chart illustrating the functioning of one or more base stations.
Figure 5:
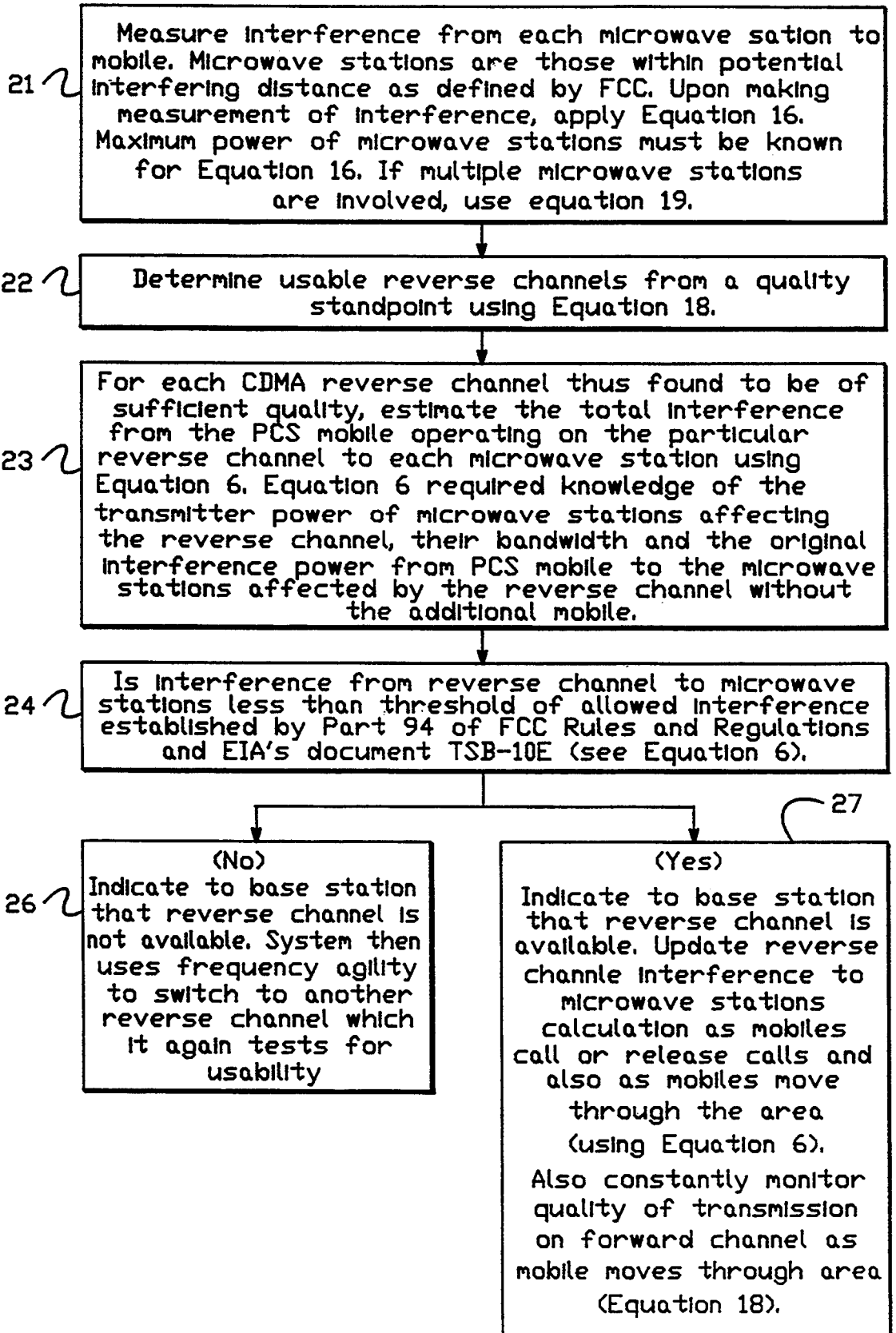
FIG. 5 is a flow chart illustrating the functioning of one or more mobile terminals.

In the case where there are multiple base stations and multiple microwave stations (for example, as illustrated in the FIG. 2 drawing), the flow charts of FIGS. 4 and 5 apply. Referring to FIG. 4, which are the computations made by the base stations, they are self-explanatory. Referring first to FIG. 4, and to step 12, a quality computation for the usable forward channel may require Equation 11. This is a generalized equation and, of course, is specifically directed to a CDMA system. Here $P_i\Phi_{i,j}$ is the portion of the power devoted to the subscriber of interest. B is a fraction of the maximum transmitted power devoted to subscribers. $Pr_{i,j}$ is the power received at the mobile due to the i-th base station.

Next, in step 13, of FIG. 4, the forward channel interference from the base stations to each microwave station is determined by Equation 7. It is necessary to include interference to all microwave user stations (that is, B stations operating on a forward channel) that are within contours defined by the FCC. The B station thus must measure the interference, $I_{B/BS}$, transmitter power of B and its operating bandwidth as well as keeping track of the interference power of B to each BS. This is illustrated by FIG. 3 and blocks 52 and 53. From a practical standpoint, the necessary data maybe passed from a base station to a mobile terminal on a control or paging channel of the system.

Parenthetically in a Qualcomm CDMA system, as mentioned before, each channel has a bandwidth of 1.23 megahertz. Within this channel are a control channel, sync and paging channels, traffic channels, and a pilot channel. As discussed above and now reiterated by step 19, the channel interference must be updated as mobiles make calls or release calls under Equation 7. Also the quality must be constantly monitored on the forward channel as the mobile moves through the area as determined by Equation 11.

Now referring to FIG. 5 and the calculations made by the mobile terminals, Equation 16 is applied in step 21. And then if multiple microwave stations (fixed users) are involved, Equation 19 is utilized. In step 22 Equation 18 determines quality (compare Equation 4).

In steps 22 and 23 interference is determined with Equation 6. And whether this interference is below the appropriate threshold is determined by Equation 6. Here $I_{A/Mi}$ is the interference power from the microwave station A to the i-th mobile; $Pt(M_i)$ is the power transmitted by the i-th mobile. This interference is multiplied by the factor BW over K. In the case of a CDMA system manufactured by Qualcomm, a typical channel bandwidth is 1.23 megahertz and thus K would be that value.

Referring to the remaining equations, Equation 8 is used to study the capacity of the CDMA system. In Equation 9 the initial term is usually very large compared to the $I_{B/BS}$. Thus the effect of interference from the microwave station B to the PCS system on the bit energy to noise density ratio at the base station can be ignored. Equation 10 relates to the pilot on a CDMA system. If the pilot in the Qualcomm system is found to be suitable normally, the traffic channel is suitable. See Equation 12. Equation 13 provides one way to divide the allowable transmission power of multiple base stations (M) for L cells.

However, one simplification can be made in the case of the computation required at the mobile terminal. For equation 6 which determines for multiple base stations and mobiles the interference caused by mobiles on the reverse channel to the microwave station A certain parameters must be known at the mobile such as the transmitter power of the microwave station, its bandwidth and the original interference power of the mobile without the additional mobile being yet added. This requires transmission of information from base station to mobile. As an alternative Equation 14 can be used. Equation 14 sets out the amount of interference the mobile is allowed to receive or hear; that is, the $I_{A/M}$ from the microwave A to the mobile on the forward channel, before the mobile is prohibited from using the corresponding reverse channel because it would cause too much interference to microwave station A. Equation 14 is universal and applies to any radio modulation technology.

Basically Equation 14 employs a worst case assumption of interference from mobiles to microwave A. This means that no information need be transmitted from base stations to the mobiles to assure that the mobiles do not interfere with microwave A in using the reverse channel. However, the quality measurement on the reverse channel must still be made by measuring interference; see Equation 5.

Figure 6:
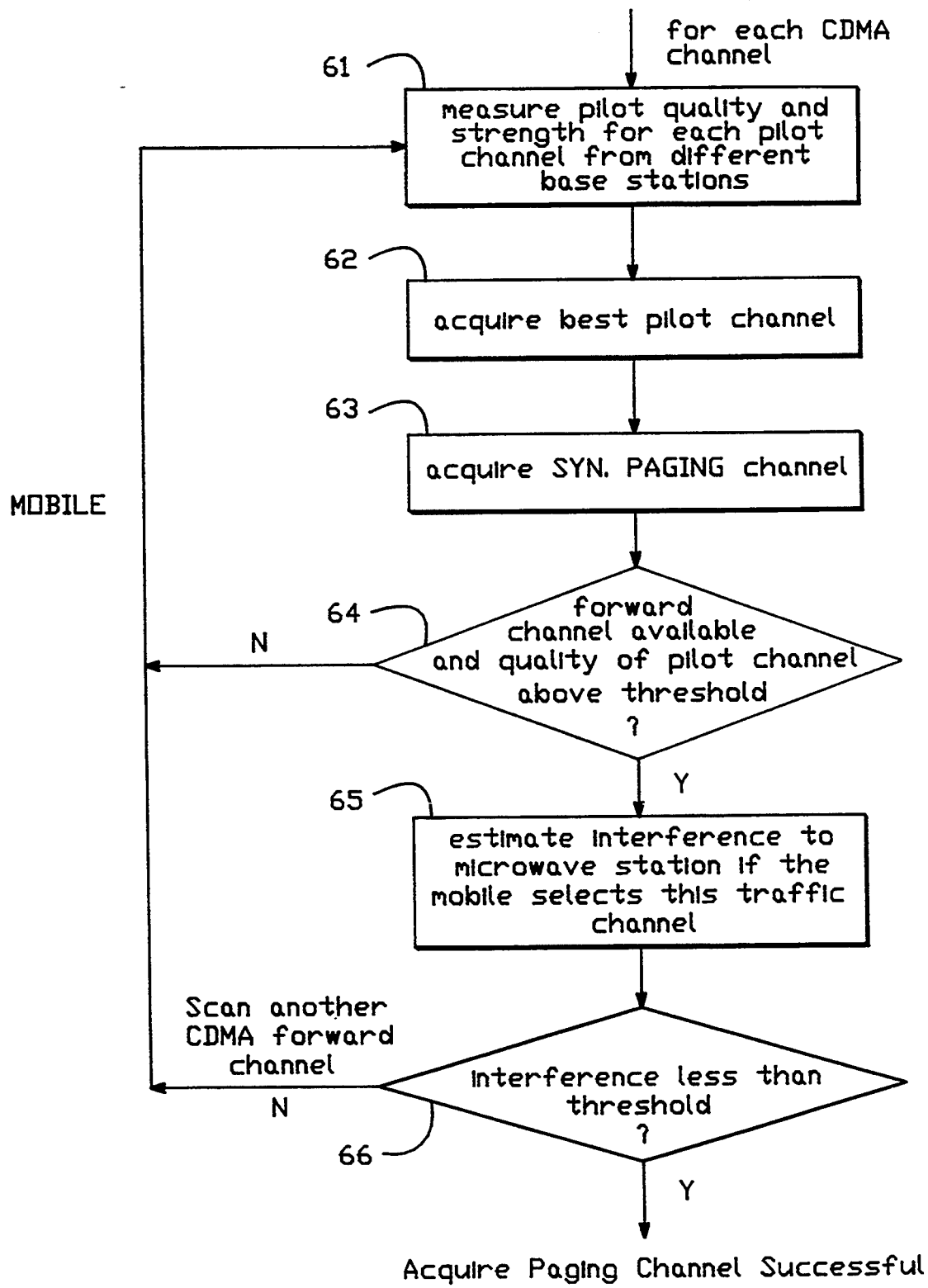
FIG. 6 is a flow chart similar to FIG. 5 for a mobile terminal but for a code division multiple access (CDMA) type of radio communications modulation technology.

FIG. 6 illustrates a flow chart for a CDMA type system and what the mobile must compute especially with the use of a so-called pilot channel. These include steps 61 through 66. The ultimate end is the acquisition of a successful paging channel which is another part of that system. In step 61 the quality and strength of the pilot channel is determined by Equation 10. In step 64, the threshold of the pilot channel is related to the threshold for the mobile which operates on the reverse channel. This is done in Equations 11 and 12. Finally in step 65, interference is estimated to the microwave fixed users using the Equation 6.

Thus in summary and referring back to the description of the prior art, the capacity of the present PCS system is increased since there is no need to assume worst case interference conditions through field propagation measurements because under the present invention real-time measurements are made based on the actual number of subscribers using the system at the time and the actual interference condition at the time and at the location of the mobile. As atmospheric conditions change or there are minor micro anomalies in the geographical area, or subscriber calls are added or relinquished, the present system accommodates these. There is no accidental interference to fixed microwave users. The invention also accommodates movement of base stations since very little time and effort and are required to update parameters. Finally the above system easily accommodates FCC regulations to assure system operators and the FCC that their PCS system is, in fact, conforming to establish parameter in avoiding interference with fixed microwave users.

EQUATIONS $$I_{B/BS}(dB) = Pt(B) - PL_{B/BS} + G_B + G_{BS} \quad (EQ\ 1)$$
$$I_{BS/B}(dB) = I_{B/BS} - Pt(B) + Pt(BS) \quad (EQ\ 2)$$
$$I_{B/BS}(dB) \leq Th_B + Pt(B) - Pt(BS) \quad (EQ\ 3)$$

$$\left(\frac{E_b}{N_o}\right)_{mobile} = \frac{Pr_{mobile}/R}{(I_{A/mobile} + \eta)/W} = \frac{Pr_{mobile} \cdot PG}{I_{A/mobile} + \eta} \quad (EQ\ 4)$$

$$I_{A/mobile}(dB) \leq Th_A + Pt(A) - Pt(mobile) \quad (EQ\ 5)$$

$$I_{PCS-mobiles/A} = \left(\sum_{i=1}^{N} \frac{I_{A/M_i}Pt(M_i)}{Pt(A)}\right)\frac{BW}{K} \leq Th_A \quad (EQ\ 6)$$

$$I_{PCS-basestations/B} = \left(\sum_{i=1}^{M} \frac{I_{B/BS_i}Pt(BS_i)}{Pt(B)}\right)\frac{BW}{K} \leq Th_B \quad (EQ\ 7)$$

$$\left(\frac{E_b}{N_o}\right)_{BSj} = \quad (EQ\ 8)$$

$$\frac{P_{Rj} \cdot PG}{(N'-1)P_{Rj} + I_{B/BSj} + I_{out} + \eta} \leq \left(\frac{E_b}{N_o}\right)_{system}$$

$$P_{Rj}(dB) = Pt(M_i) - PL_i \quad (EQ\ 9)$$

$$\left(\frac{E_b}{N_o}\right)_{pilot\ i,j} \geq \frac{(1-\beta)Pr_{i,j} \cdot PG}{\left(\sum_{i=1}^{M} Pr_{i,j}\right) + I_{A/Mj} + \eta} \quad (EQ\ 10)$$

-continued
EQUATIONS $$\left(\frac{E_b}{N_o}\right)_{mobile\ i,j} \geq \quad (EQ\ 11)$$

$$\frac{\beta\Phi_{i,j}Pr_{i,j} \cdot PG}{\left(\sum_{i=1}^{M} Pr_{i,j}\right) + I_{A/Mj} + \eta} \geq \left(\frac{E_b}{N_o}\right)_{system}$$

$$\frac{(E_b/N_o)_{pilot\ i,j}}{(E_b/N_o)_{mobile\ i,j}} = \frac{1-\beta}{\beta\Phi_{i,j}} \quad (EQ\ 12)$$

$$Pt(BS_i) \leq \frac{Th_B Pt(B)}{(M-L)I_{B/BS_i}} \quad (EQ\ 13)$$

$$I_{A/M_i} \leq \frac{Th Pt(A)_{min}}{N_{max} Pt(M_i)_{max} \gamma_{max}} = Th\_Interference \quad (EQ\ 14)$$

$$I_{MICRO/BSj} = \sum_{i=1}^{K} \frac{Pt(B_i)}{PL_{B_i/BSj}} \quad (EQ\ 15)$$

$$I_A/mobile(dB) = \quad (EQ\ 16)$$
$$Pt(A) - PL_{A/MOBILE} + GA + G_{MOBILE}$$

$$I_{mobile/A}(dB) = I_{A/MOBILE} - Pt(A) + Pt(mobile) \quad (EQ\ 17)$$

$$\frac{E_b}{N_o}(BS) = \frac{P_{r/BS}/R}{(I_{B/BS} + n)/W} = \frac{P_{rBS} \cdot PG}{I_{B/BS} + n} \quad (EQ\ 18)$$

$$I_{MICRO/MOBILE_j} = \sum_{i=1}^{K} \frac{Pt(A_i)}{PL_{A_i/mobile_j}} \quad (EQ\ 19)$$

What is claimed is:

1. A method of determining the availability of wireless communication traffic channels having a quality of transmission suitable for effective communication for use between fixed base stations, having known powers, in a predetermined geographical region and relatively mobile subscriber terminals where said base stations and mobile terminals are linked by forward and reverse frequency channels and where the radio spectrum in which said traffic channels operate must co-exist on a frequency sharing basis with existing fixed radio frequency users, having known powers and operating bandwidths, without interference either to or from said fixed users, the method comprising automatically and dynamically and in a frequency agility manner adjusting to interference to or from said fixed users by selecting and reselecting as necessary traffic channels by the following steps:

measuring interference from said fixed users to said base stations for reverse frequency channels and determining the quality of at least one of said reverse frequency channels;

comparing said determined quality of said at least one of said reverse channels to a predetermined quality threshold to determine if said determined quality is acceptable and said at least one of said reverse channels is usable from a quality standpoint;

determining interference from said base stations to said fixed users on forward frequency channels by using said above measured reverse channel interference, and said known powers of said base stations and said fixed users and said operation bandwidths of said fixed users;

comparing said determined interference on said forward frequency channels to a predetermined interference threshold to determine forward channel usability from an interference standpoint;

measuring interference from said fixed users to a mobile terminal on forward channels and determining the quality of said forward channels;

comparing said determined quality of said forward channels to a predetermined quality threshold to determine if said forward channel quality is acceptable and is usable from a quality standpoint;

determining interference from said mobile terminal to said fixed users on reverse channels by using said above measured forward channel interference;

comparing said determined interference on said reverse channels to a predetermined interference threshold to determine reverse channel usability from an interference standpoint;

assigning said base stations to a forward traffic channel and assigning said mobile terminal to a reverse traffic channel which meet all of said predetermined thresholds;

and continuing to measure interference at said base stations and mobile terminals with the system automatically and dynamically adjusting to changes in interference and quality by moving traffic from existing traffic channels to new traffic channels which meet all of said interference and quality thresholds whenever interference or quality move below predetermined interference and predetermined quality thresholds respectively.

2. A method as in claim 1 wherein said step of determining the quality of the reverse channel includes for a code division multiple access (CDMA) wireless communications system determining a figure of merit based on a ratio of bit energy to noise density.

3. A method as in claim 1, where in said steps of determining interference the same path loss will occur in both directions to and from said fixed users.

4. A method as in claim 1, wherein said mobile terminals have known powers and wherein said step of determining interference from said mobile terminal to said fixed users on said reverse channels, data including the known powers of said mobile terminal and fixed users and the operating bandwidths and frequency of said fixed users are also utilized.

5. A method as in claim i where by utilizing measurement of interference to the forward channels and reverse channels from fixed users it is possible to determine the interference that is being caused by the total system to fixed users.

6. A method of determining the availability of wireless communication traffic channels having a quality of transmission suitable for effective communication for use between a fixed base station, having a known power, in a predetermined geographical region and a relatively mobile subscriber terminal where said base station and mobile terminal are linked by forward and reverse frequency channels and where the radio spectrum in which said traffic channels operation must co-exist on a frequency sharing basis with existing fixed radio frequency users, having known powers and operating bandwidths, without interference either to or from said fixed users, the method comprising automatically and dynamically adjusting to interference to or from said fixed users by selecting said traffic channels by the following steps:

measuring interference from one of said fixed users to said base station for a reverse frequency channel and determining the quality of said reverse frequency channel;

determining interference from said base station to said one of said fixed users on a forward channel by using said above measured reverse channel interference, and said known power of said base station and said one of said fixed users and said operating bandwidths of said one of said fixed users;

comparing said determined interference to a predetermined interference threshold;

measuring interference from said one of said fixed users to said mobile terminal for a forward frequency channel and determining the quality of said forward channel;

determining interference from said mobile terminal to said one of said fixed users on a reverse channel by using said above measured forward channel interference;

comparing said determined interference on said reverse channel to a predetermined interference threshold;

and assigning said mobile terminal to a traffic channel providing interference below all of said predetermined interference thresholds.

* * * * *